April 2, 1968
J. F. TAPLIN
3,375,760
ROLLING DIAPHRAGM DEVICE HAVING SPRING-BIASED PISTON
AND MEANS FOR PRECLUDING TRANSMISSON
OF SPRING-WINDUP TO PISTON
Filed July 26, 1966
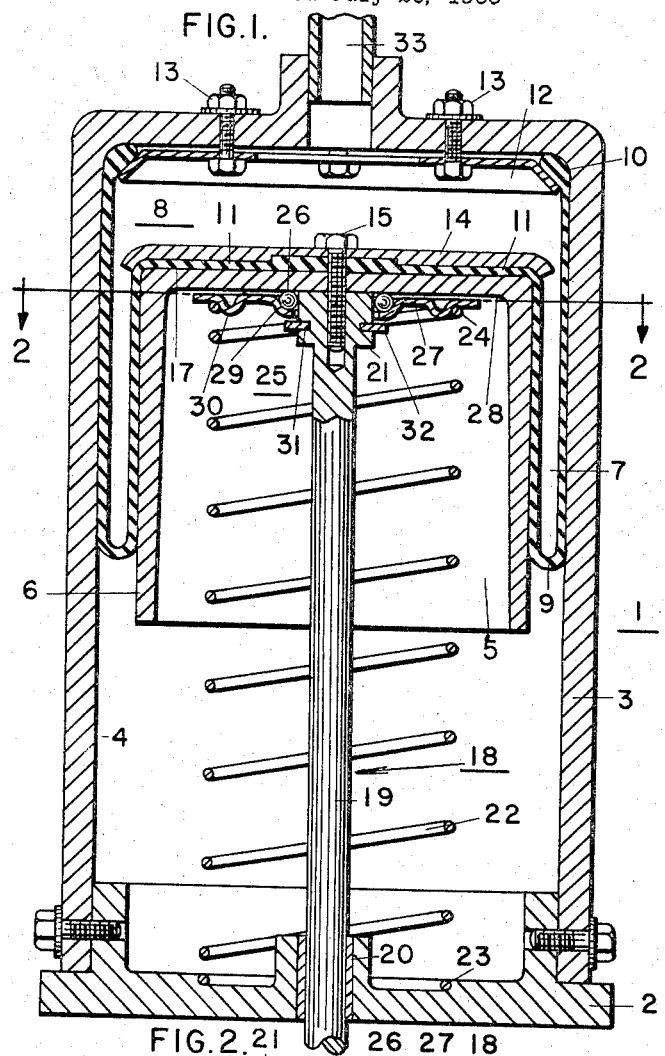
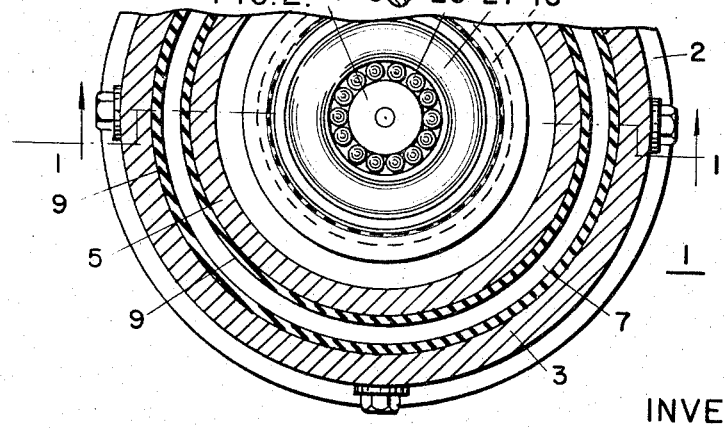
INVENTOR:
JOHN F. TAPLIN,
BY [signature] ATTORNEY

United States Patent Office 3,375,760
Patented Apr. 2, 1968

3,375,760
ROLLING DIAPHRAGM DEVICE HAVING SPRING-BIASED PISTON AND MEANS FOR PRECLUDING TRANSMISSION OF SPRING-WINDUP TO PISTON
John F. Taplin, 15 Sewall St.,
West Newton, Mass. 02165
Filed July 26, 1966, Ser. No. 567,929
2 Claims. (Cl. 92—99)

ABSTRACT OF THE DISCLOSURE

A rolling diaphragm device, such as a pump or actuator, having a rolling diaphragm clamped to a housing and to a piston, with a helical piston-biasing spring positioned between the housing and a rotatably mounted ball bearing retainer plate adjacent the piston to prevent any twisting motion of the spring from being impared to the piston and diaphragm.

---

This invention relates to rolling diaphragm devices such as used as piston pumps, as actuators or positioners of parts, and for many other purposes.

This invention refers more particularly to rolling diaphragm devices having a helical piston-biasing spring.

It is a general object of this invention to provide improved rolling diaphragm devices of the aforementioned decsription.

The essential parts of a rolling diaphragm device are a cylinder body having an inner lateral wall having a predetermined diameter, a piston inside said cylinder body movably arranged therein in coaxial relation thereto and having a lateral wall having a smaller outer diameter than said inner lateral wall of said cylinder body. Thus the inner lateral wall of said cylinder body and said lateral wall of said piston define a toroidal gap space. The rolling diaphragm device further includes a rolling diaphragm having a rolling wall portion arranged inside said toroidal gap space, a radially outer portion attached to said cylinder body and a radially inner portion attached to said piston. The piston is provided with a piston rod, or shaft, arranged inside of said cylinder body in coaxial relation thereto, one end of the piston rod, or shaft, being attached to the piston.

The piston is under the action of a helical piston-biasing spring arranged inside the cylinder body in coaxial relation to the piston. The piston-biasing spring has a pair of ends exerting an axial thrust against the cylinder body and exerting an opposite axial thrust against the piston. The pair of ends of the piston-biasing spring have a tendency to turn the end thereof relative to each other. This tendency of helical springs is sometimes referred-to as spring windup. When a helical spring is compressed, or allowed to expand, the top end of the spring turns with respect to the bottom end. This wind-up action of the biasing spring causes a certain twist or rotary motion to the piston about the longitudinal axis thereof. As a result, the radially inner portion of the rolling diaphragm attached to the piston imparts its twisting or rotary motion to the rolling wall portion of the rolling diaphragm. Since the radially outer portion of the rolling diaphragm is fixedly clamped to the cylinder body, the rolling wall of the rolling diaphragm is subjected to a torsional twisting action which is very damaging to it.

It is, therefore, another object of this invention to provide rolling diaphragm devices wherein the spring-windup is not transferred to the rolling diaphragm and to the rolling wall portion thereof.

A further object of the invention is to provide rolling-diaphragm devices wherein the flexing life of the rolling diaphragm is not reduced by the torsional action, or twisting action, normally resulting from spring-windup.

A still further object of this invention is to provide rolling diaphragm devices wherein the rolling diaphragm is not subject to any torsional or twisting action resulting from spring-windup and in which rolling diaphragm devices this end is achieved by means which are of utmost simplicity and which hardly increase the manufacturing cost of the rolling diaphragm device.

These and other objects of the invention and advantages thereof will be more apparent from the ensuing detailed description of the invention and of a preferred embodiment thereof which is shown in the appended drawing.

FIG. 1 of the drawing is a horizontal section of a rolling diaphragm actuator embodying this invention taken along 1—1 of FIG. 2; and FIG. 2 is a section along 2—2 of FIG. 1.

In the drawing reference numeral 1 has been applied to generally indicate a cylinder body including the base 2 and the bonnet 3. Bonnet 3 has an inner lateral wall 4 having a predetermined diameter. Piston 5 is movably arranged inside of cylinder body 1 in coaxial relation thereto and has a lateral wall 6 having a smaller outer diameter than the inner lateral wall 4 of bonnet 3. Thus the inner lateral wall 4 of bonnet 3 and the outer lateral wall 6 of piston 5 define a toroidal gap space 7. Reference numeral 8 has been applied to generally indicate a rolling diaphragm. The latter includes a convoluted rolling wall portion 9 arranged in toroidal gap space 7, a radially outer portion in form of a circular bead 10 attached to cylinder body 1 or bonnet 3, respectively, and a radially inner portion or clamping flange 11 attached to piston 5. Reference numeral 12 has been applied to indicate a plate screwed at 13 against the end surface of bonnet 3 and having a cone-shaped periphery clamping bead 10 against the inner surface of bonnet 3. Clamping plate 14 clamps the radially inner portion 11 of rolling diaphragm 8 by means of screw 15 against the axially outer end surface 17 of piston 5. Reference numeral 18 has been applied to generally indicate a piston rod, or shaft, having a portion 19 of relatively small diameter slidable in a bearing 20 integral with base 2, and having an upper collar portion 21 of relatively large diameter. Screw 15 projects transversely across the head of piston 5 into the wide diameter portion 21 of piston rod or shaft 18. Reference numeral 22 has been applied to indicate a helical piston-biasing spring arranged inside cylinder body 1 in coaxial relation to both bonnet 3 and piston 5. Spring 22 has a lower end 23 exerting an axial thrust against cylinder body 1, or the base 2 thereof, and an upper end 24 exerting an opposite axial thrust against piston 5, as will be explained below more in detail.

As explained above, spring 22 has a tendency when compressed, or when allowed to expand, to turn ends 23, 24 relative to each other about the common geometrical axis of cylinder body 1 and piston 5. The structure of FIGS. 1 and 2 includes means for precluding a rotary motion of piston 5 relative to piston body 1 or bonnet 3, respectively, on account of the above tendency of the ends 23, 24 of spring 22 to turn comcomitant with a compression or expansion of spring 22. Said rotary piston motion precluding means includes a roller means structure generally indicated by reference numeral 25 arranged inside of cylinder body 1, pivotable about the common axis of cylinder body 1 and piston 5 and supporting one end of spring 22.

In the preferred embodiment of the invention shown the roller means structure 25 supports the upper end 24 of spring 22 and it includes a plurality of rollers or balls 26 and a retainer plate 27 for the latter. Rollers or balls 26 are arranged in a circular pattern in coaxial relation to piston 5 adjacent the axially inner end surface 28 thereof. Retainer plate 27 is supported by piston rod 18. To be more specific, portion 21 of piston rod, or shaft, 18 is arranged in abutting relation to the axially inner end surface 28 of piston 5 and screwed against the latter by screw 15. Balls 26 are arranged so close to collar portion 21 of piston rod 18 to constitute that portion a first raceway for balls 26. Retainer plate 27 defines an annular recess 29 for balls 26 constituting a second raceway for balls 26. Retainer plate 27 is further provided with a centering abutment for spring 22 formed by a substantially annular projection 30 thereof. Portion 21 of piston rod, or shaft, 18 is provided with a peripheral annular groove 31 receiving the radially inner portion of annular member 32 supporting retainer plate 27.

The top end of bonnet 3 is provided with a fluid-admission and fluid-draining tube 33 and the admission of fluid under pressure into cylinder body 1 results in a downward movement of piston 5 against the action of piston-biasing spring 22. During the downward stroke of piston 5 rolling wall 9 of diaphragm 8 rolls off the lateral wall 6 of piston 5 onto the lateral wall 4 of cylinder body 1, or bonnet 3, respectively. During the upward stroke of piston 5 which is caused by release of fluid under pressure through passageway 33 the rolling wall 9 of diaphragm 8 performs a reverse movement, i.e. it rolls off lateral wall 4 of bonnet 3 and onto side wall of piston 5. FIG. 1 shows piston 5 adjacent its upper limit position when a large portion of the rolling wall 9 of diaphragm 8 has rolled off side wall 4 onto side wall 6.

If the rolling diaphragm device is intended to be used as a pump rather than as an actuator, or positioner, two fluid passageways (not shown) are substituted for the single passageway 33, each of these two fluid passageways being under the control of a check valve.

Compression and consecutive expansion of piston-biasing spring 22 results normally in a windup action tending to pivot piston 5 back and forth as it is moved up and down along bonnet 3 and to subject rolling wall 9 to an oscillatory twisting action greatly reducing its life, or period of usefulness. By virtue of the presence of the roller means 26 and the parts which are associated with them spring 22 can but transmit axial thrusts, but cannot transmit any twisting torque upon piston 5 and rolling diaphragm 8 and its rolling wall 9.

It will be understood that the roller means for precluding transmission of a torque from spring 22 to piston 5 must not necessarily be placed inside of piston 5. While this is the preferred location of these roller means the same might be arranged at another point of the rolling diaphragm device, e.g. adjacent the base 2 for bonnet 3.

It will further be noted that part 27 is a dual function part, one of its functions being to form a centering abutment for spring 22, and the other of its functions being to form a raceway for balls 26.

It will also be understood that I have illustrated and described herein a preferred embodiment of my invention, and that various alterations may be made therein without departing from the spirit and scope of the appended claims.

I claim as my invention:
1. A rolling diaphragm device comprising:
   (a) a cylinder body having an inner lateral wall having a predetermined diameter;
   (b) a piston inside said cylinder body movably arranged therein in coaxial relation thereto and having a lateral wall having a smaller outer diameter than said inner lateral wall of said cylinder body, said inner lateral wall of said cylinder body and said lateral wall of piston defining a toroidal gap space;
   (c) a rolling diaphragm having a rolling wall portion arranged in said gap space, a radially outer portion attached to said cylinder body and a radially inner portion attached to said piston;
   (d) a piston rod arranged inside said cylinder body in coaxial relation thereto and having one end attached to said piston, said rod including means defining a collar integral with the piston rod having a larger diameter than the piston rod, said collar being in abutting relation to the axially inner end surface of said piston and attached to said piston;
   (e) a helical piston-biasing spring arranged inside said cylinder body in coaxial relation to said piston, said spring having a pair of ends one exerting an axial thrust against said cylinder body and the other exerting an opposite axial thrust against said piston, said pair of ends of said spring having a tendency to turn said pair of ends thereof relative to each other upon compression and upon expansion of said spring; and
   (f) means for precluding a rotary motion of said piston relative to said cylinder body on account of said tendency of said pair of ends of said spring to turn relative to each other, said rotary piston-motion-precluding means including a plurality of balls arranged in a circular pattern around said collar portion of relatively large diameter of said piston rod to constitute said collar a first raceway for said plurality of balls, a retainer plate for said plurality of balls defining an annular recess receiving said plurality of balls, said recess constituting a second raceway for said plurality of balls, means for supporting said retainer plate adjacent to said collar portion of relatively large diameter of said piston, rod, and a centering abutment integral with said retainer plate and formed by a substantially annular projection thereof for receiving the end of the spring adjacent the piston.

2. A rolling diaphragm device as specified in claim 1 wherein said collar of said piston rod is provided with a peripheral annular groove receiving an annular member supporting said retainer plate.

References Cited
UNITED STATES PATENTS

| | | | |
|---|---|---|---|
| 2,290,558 | 7/1942 | Helms | 92—130 X |
| 2,337,766 | 12/1943 | Newell | 92—130 X |
| 2,366,121 | 12/1944 | Martin-Hurst | 92—130 X |
| 2,574,700 | 11/1951 | Knauss. | |
| 2,950,739 | 8/1960 | Lofink | 92—99 X |
| 3,153,988 | 10/1964 | Warstler. | |
| 3,311,028 | 3/1967 | Taplin | 92—99 |

FOREIGN PATENTS 447,791  4/1948  Canada.

MARTIN P. SCHWADRON, *Primary Examiner.*

I. C. COHEN, *Assistant Examiner.*